June 29, 1943.   M. H. LOUGHRIDGE   2,323,062
RAILWAY SWITCHING SYSTEM AND APPARATUS
Filed July 21, 1941
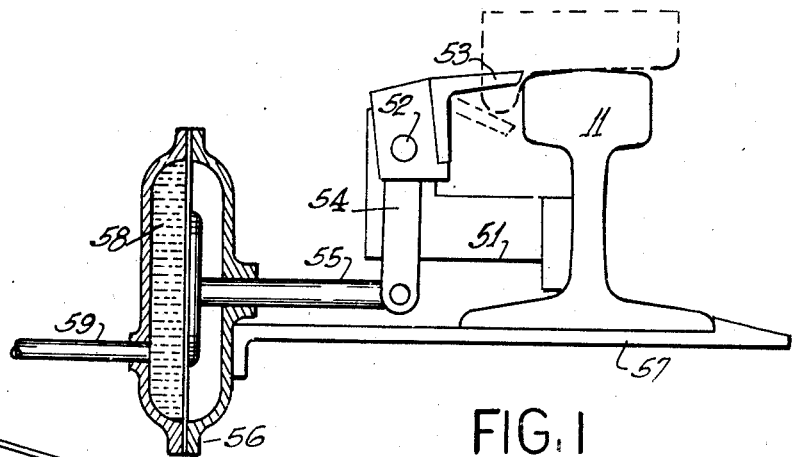
FIG. 1
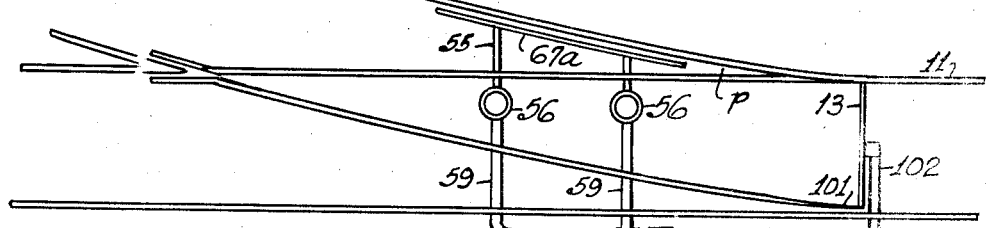
FIG. 2
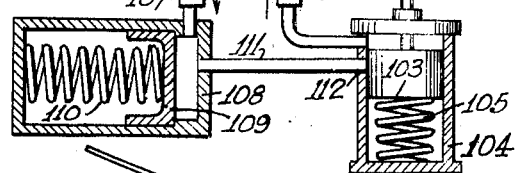
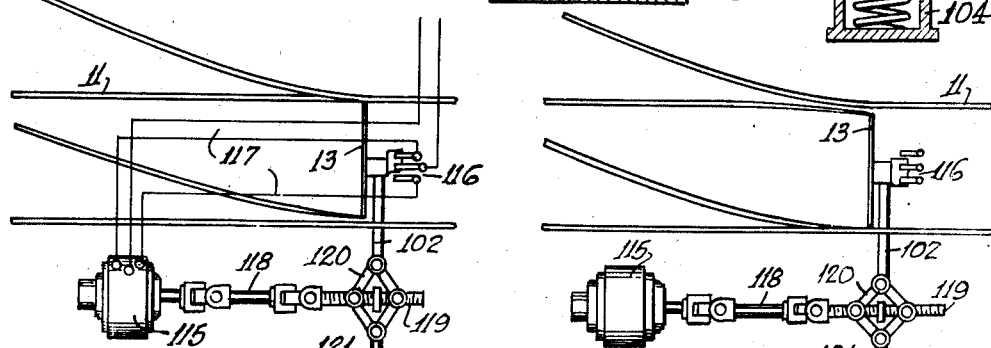
FIG. 3    FIG. 4
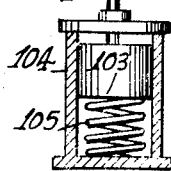
INVENTOR.
Matthew H. Loughridge Patented June 29, 1943

2,323,062

UNITED STATES PATENT OFFICE 2,323,062

RAILWAY SWITCHING SYSTEM AND APPARATUS

Matthew H. Loughridge, Bogota, N. J.; William R. Lockridge administrator of said Matthew H. Loughridge, deceased Application July 21, 1941, Serial No. 403,666

14 Claims. (Cl. 246—321)

This invention relates to railway switching systems and apparatus.

An object of the invention is to provide a railway switch operated by a hydraulic mechanism from the wheels of a passing train, and, another object of the invention is to provide a spring switch operated by the train in a trailing direction with means for storing power obtained from the wheel of the train for operating and retaining the switch in position, against the spring, for traffic in a trailing direction.

Another object of the invention is to provide for the operation of the switch electrically.

Other objects of the invention will be more particularly understood from the following specification and the accompanying drawing, in which:

Fig. 1 is an elevation, partly sectioned, showing the hydraulic operation of a switch operated in accordance with this invention;

Fig. 2 is a track diagram of a spring switch operated by hydraulic power in the trailing direction, Fig. 3 is a plan view of the switch in Fig. 2, also adapted for electric operation in the normal position, and Fig. 4 is a switch corresponding to Fig. 3 which is reversed by the electric motor.

In this invention a spring switch connects the side track to the running track so that the switch always has a normal position. Trains running out of the side track trails through the track switch and in order to provide for operating the switch to the reverse position for trailing movements a diaphragm cylinder, connected with a deflecting bar, stores hydraulic pressure fluid in a spring controlled cylinder by the engagement of the wheel of the vehicle with the deflecting bar. When the leading wheel of the train engages the crotch of the switch and gives it an initial movement, a valve is thereby opened which admits the fluid pressure from the spring cylinder to operate the switch cylinder and reverse the switch. When the switch is also to be operated by power, as for instance in an electric interlocking system, a lazy jack connection is provided in the switch rod, connecting to the switch cylinder, and the lazy jack is operated by the electric motor to reverse the switch points without disturbing the hydraulic system used in trailing through the switch.

One form of mechanism that may be used to operate the switches is shown in Fig. 1, in which a treadle 53, pivoted at 52, on bracket 51 and through crank arm 54 and plunger 55 operates a diaphragm in cylinder 56 against the fluid 58, which connects by conduit 59 and 106 through check valve 107 with cylinder 108. The bracket 51 is supported on the rail and a single wheel of the vehicle engaging the treadle 53 to depress it to the dotted line position generates the power to energize the cylinder 108 and compress the spring 110 therein.

The operation of the spring switch is shown in Fig. 2. In this type of switch the flanges of the wheels in the trailing direction move the switch points against the action of a spring which holds it in the normal position. In the former types of spring switch operated from the trackway, each wheel moves the points introducing an undue amount of wear on the wheels and the switch mechanism. In the present arrangement, as soon as the first pair of wheels gives an initial displacement to the switch it is reversed and remains reversed until the entire train moves over it; this is obtained by storing energy for this purpose.

The treadle 67a, which corresponds to treadle 53, through the pair of diaphragm cylinders 56, supplies pressure fluid to conduits 59 and 106 and through check valve 107 to cylinder 108, thereby moving piston 109 against the spring 110, and storing the energy in the spring.

A switch 13, through rod 102, connects to piston 103 in cylinder 104 which, by spring 105, holds the switch in a normal position with the switch rail open at 101. When the train approaching the switch in the trailing direction reaches the point F the switch points are deflected slightly towards closing the opening at 101. This operation moves the piston 103, to open at 112 the connection for the conduit 111 that leads from the spring cylinder 108, and permits pressure in cylinder 108 to be applied to cylinder 104 to reverse the switch. Piston 103 acts as a valve which closes conduit 111 until opened by the initial movement of the switch 13. Pressure is applied to cylinder 108 as long as the wheels engage the treadle 67a and the check valve 107 prevents the direct return of the fluid to the diaphragm cylinders 56. The fluid pressure from cylinder 108 gradually passes to cylinder 104 and returns through check valve 113, when there is no opposing pressure in conduit 106, to the diaphragm cylinders 56, enabling the mechanism to be restored to the normal position by the spring in cylinder 104. In the arrangement shown the trains are assumed to be relatively short such that cylinder 108 has sufficient capacity to store the energy produced by the movement of treadle 67a.

When it is necessary to operate the facing switch by remote control, while the trailing switch is operated by pressure obtained from the wheels of the approaching train, the arrangement in Figs. 3 and 4 may be used. In this arrangement, the connecting rod 102 from the switch connects to the piston 121 of cylinder 104 by a lazy-jack mechanism 120, which is controlled by screw 119 connected by a universal connection 118 with the motor 115, that is controlled by circuit 117 and controller 116 on the switch rod 102. The controlling circuits of the motor are not further shown, but the circuit shown in Patent No. 1,381,317, of June 14, 1921, may be used to operate the motor. The motor, when operated in one direction expands the lazy jack by the right and left screw 119 and shortens the connection to the switch to change its position, as in Fig. 4. When the motor is operated in the reverse direction, the lazy-jack is restored to normal length as in Fig. 3, and the universal connection 118 permits the free operation of the switch by the cylinder 101 in either case.

Modifications may be made in the arrangement and location of parts within the spirit and scope of my invention, and such modifications are intended to be covered in the appended claims.

Having thus described my invention, I claim:

1. A railway switching mechanism comprising switch rails with a spring for maintaining said switch in a normal position, a storage cylinder with a spring controlled piston operated by a train approaching said switch in a trailing direction for storing energy and means connected with said switch rails for releasing said energy from said storage cylinder to operate the switch to the reversed position after its initial movement towards the reversed position.

2. A railway switching mechanism comprising switch rails with a spring for maintaining said switch in a normal position, a switch cylinder with a piston connected to said switch for operating the switch against said spring, a fluid pressure device operated by each wheel of a vehicle approaching the switch, means for storing said fluid pressure, means connecting said fluid pressure to said switch cylinder for operating said switch, and means for establishing said connection by the initial movement of said piston.

3. A railway switching mechanism comprising switch rails with a switch cylinder having a spring for maintaining said switch in a normal position, a fluid pressure device operated by a train approaching the switch, a storage cylinder with a spring receiving said fluid pressure, means connecting said storage cylinder to said switch cylinder to operate said switch, and means normally restricting said connection and operated by the initial movement of the switch to apply the fluid pressure to the switch to move it to the reversed position.

4. A railway switching mechanism comprising switch rails, a cylinder with a spring operated plunger for maintaining said switch rails in a normal position, a deflecting bar mounted adjacent the rail to be engaged by a wheel on the track, a plurality of fluid pressure devices operated by the deflection of said bar, means connecting said fluid pressure devices with said switch cylinder, means normally closing said connection and means operated by the initial movement of the switch rails for opening said connection and applying the fluid pressure to operate the switch against the spring.

5. A railway switching mechanism comprising switch rails, a cylinder with a spring operated plunger, a connection from said plunger for operating said switch rails by said spring, fluid pressure means operated by the movement of a train approaching the switch, means connecting said fluid pressure means with said cylinder for operating the switch against the spring, a motor for operating said switch independently of said fluid pressure and means operated by said motor for varying said connection between said cylinder and switch to operate the switch.

6. A railway switching mechanism comprising switch rails, a cylinder with a spring operated plunger, a connection from said plunger for operating said switch by said spring, a lazy-jack in said connection for varying the length of said connection, fluid pressure means operated by the movement of a train approaching said switch, means connecting said fluid pressure means with said cylinder for operating the switch against the spring and a motor independently operating said switch through said lazy-jack.

7. A railway switching mechanism comprising, in combination, a deflecting bar to be engaged by a wheel on the rail, a diaphragm cylinder with a plunger operated by said deflecting bar, a pressure fluid in said cylinder compressed by said diaphragm, a storage cylinder with a spring pressed piston, means connecting said storage cylinder with said diaphragm cylinder to operate said piston by the pressure on said diaphragm, switch rails, a switch operating cylinder having a piston operatively connected with said switch rails, a spring normally moving said switch rails to the normal position, and means operatively connecting said switch cylinder with said storage cylinder to move said switch rails to the reversed position.

8. A railway switching mechanism comprising, in combination, a deflecting bar to be engaged by a wheel on the rail, a diaphragm cylinder with a plunger operated by said deflecting bar, a hydraulic fluid in said diaphragm cylinder subject to pressure from said diaphragm, a spring controller expansion cylinder connected with said diaphragm cylinder for storing the hydraulic fluid under pressure, switch rails, a switch operating cylinder having a piston operatively connected with said switch rails, a spring normally moving said switch rails to the normal position, and means operatively connecting said switch cylinder with said storage cylinder to move said switch rails to the reversed position.

9. A railway switching mechanism comprising, in combination, a spring controlled expansion cylinder, means for applying fluid pressure to said cylinder, switch rails, a switch operating cylinder with a piston operatively connected with said switch rails, means connecting the fluid pressure in said expansion cylinder with said switch operating cylinder and means controlling said connection by said piston.

10. A railway switching mechanism comprising, in combination, a spring controlled mechanism operatively connected with the switch to move it to the normal position, means embodied in said mechanism for moving said switch in opposition to said spring, and an electric motor also operatively connected with said switch and arranged to operate the switch independently of said spring controlled mechanism to the normal and reversed positions.

11. A railway switching mechanism comprising, in combination, movable switch rails, a spring controlled mechanism, a switch rod connecting said mechanism with said switch rails to move the rails by the spring to the normal position, means for moving said rails independently of said spring controlled mechanism by changing the effective length of said rod, and electrically controlled means for changing the length of said switch rod.

12. A railway switching mechanism comprising, in combination, movable switch rails, a spring controlled mechanism, a switch rod connecting said mechanism with said switch rails to move the rails by the spring to a normal position, a screw operated lazy-jack embodied in said rod and a motor for operating said screw in one direction to move the switch rails to the normal position and in the opposite direction to move the switch rails to the reversed position.

13. A railway switch mechanism as defined in claim 12, with a universal connection between the motor and the screw.

14. A railway switching system comprising a pressure fluid cylinder, a pressure storage cylinder, switch rails and a switch operating cylinder and conduits between said pressure fluid cylinder, a storage cylinder and operating cylinder including check valves to direct the fluid pressure to the storage cylinder, from this cylinder to the operating cylinder, and from the operating cylinder to the pressure fluid cylinder.

MATTHEW H. LOUGHRIDGE.